US012773973B2

(12) United States Patent
Ståhl et al.

(10) Patent No.: US 12,773,973 B2
(45) Date of Patent: Oct. 27, 2026

(54) METHOD OF CONTROLLING OPERATION OF A VEHICLE, COMPUTER PROGRAM, COMPUTER-READABLE MEDIUM, CONTROL ARRANGEMENT, AND VEHICLE

(71) Applicant: Scania CV AB, Södertälje (SE)

(72) Inventors: Daniel Ståhl, Enköping (SE); Martin Berglund, Vagnhärad (SE); Jan Dellrud, Gnesta (SE); Karl Vestgöte, Nyköping (SE); Magnus Carlgren, Vagnhärad (SE)

(73) Assignee: Scania CV AB, Södertälje (SE)

( * ) Notice: Subject to any disclaimer, the term of this patent is extended or adjusted under 35 U.S.C. 154(b) by 0 days.

(21) Appl. No.: 18/916,905

(22) Filed: Oct. 16, 2024

(65) Prior Publication Data

US 2025/0136073 A1 May 1, 2025

(30) Foreign Application Priority Data

Oct. 30, 2023 (SE) .................................... 2351234-6

(51) Int. Cl.
*B60T 8/24* (2006.01)
*B60L 7/10* (2006.01)
(Continued)

(52) U.S. Cl.
CPC ............ *B60T 8/245* (2013.01); *B60T 8/1708* (2013.01); *B62D 61/125* (2013.01); *B60L 7/10* (2013.01);
(Continued)

(58) Field of Classification Search
CPC .... B60T 8/245; B60T 8/1708; B60T 2210/32; B60T 2260/00; B60T 8/00; B62D 61/125;
(Continued)

(56) References Cited

U.S. PATENT DOCUMENTS

| | | | |
|---|---|---|---|
| 10,218,837 | B1 | 2/2019 | Dweck et al. |
| 2016/0176403 | A1 | 6/2016 | Weston |

(Continued)

FOREIGN PATENT DOCUMENTS

| | | | |
|---|---|---|---|
| DE | 102019002607 | A1 | 10/2019 |
| DE | 102019007532 | A1 | 4/2020 |

(Continued)

OTHER PUBLICATIONS

Machine Translation of WO 2013141787 A1 PDF File Name: "WO2013141787A1_Machine_Translation.pdf" (Year: 2013).*

(Continued)

*Primary Examiner* — Grant Moubry
*Assistant Examiner* — Ruben Picon-Feliciano
(74) *Attorney, Agent, or Firm* — Moore & Van Allen PLLC; W. Kevin Ransom

(57) ABSTRACT

A method of controlling operation of a vehicle is disclosed, wherein the vehicle comprises an auxiliary braking system and a number of wheel axles each comprising wheels and wheel brakes controllable to brake the wheels, and wherein one or more of the number of wheel axles is a liftable wheel axle. The method comprises the step of controlling at least one of the one or more liftable wheel axles from a lifted position to a lowered position if the at least one liftable wheel axle is in the lifted position and a ratio between an estimated braking capacity of the auxiliary braking system and a current or impending braking need of the vehicle is below a first threshold ratio. The present disclosure further relates to a computer program, a computer-readable medium, a control arrangement, and a vehicle.

19 Claims, 1 Drawing Sheet

(51) Int. Cl.
*B60T 8/17* (2006.01)
*B62D 61/12* (2006.01)

(52) U.S. Cl.
CPC ....... *B60T 2210/32* (2013.01); *B60T 2260/00* (2013.01)

(58) Field of Classification Search
CPC ........... B62D 59/04; B62D 61/12; B60L 7/10; B60L 7/26; B60G 2204/47; B60G 2204/62; B60G 2300/0262; B60G 2400/37; B60G 2800/22
See application file for complete search history.

(56) References Cited

U.S. PATENT DOCUMENTS

| | | | | |
|---|---|---|---|---|
| 2022/0388586 | A1 | 12/2022 | Seeger | |
| 2023/0008352 | A1 | 1/2023 | Oshita et al. | |
| 2023/0173862 | A1 | 6/2023 | Noland | |
| 2025/0187633 | A1* | 6/2025 | Burchett | B60W 10/18 |
| 2025/0289402 | A1* | 9/2025 | Bieber | B60T 8/1766 |

FOREIGN PATENT DOCUMENTS

| | | | | |
|---|---|---|---|---|
| SE | 1950479 | A1 | 10/2020 | |
| WO | WO-2013141787 | A1 * | 9/2013 | G01M 17/007 |
| WO | WO-2013158015 | A1 * | 10/2013 | B60G 17/019 |
| WO | 2022194357 | A1 | 9/2022 | |

OTHER PUBLICATIONS

Machine Translation of WO 2013158015 A1 PDF File Name: "WO2013158015A1_Machine_Translation.pdf" (Year: 2013).*

Scania CV AB, Swedish Patent Application No. 2351234-6, Office Action, Apr. 16, 2025.

Scania CV AB, Swedish Patent Application No. 2351234-6, Office Action, May 21, 2024.

* cited by examiner

METHOD OF CONTROLLING OPERATION OF A VEHICLE, COMPUTER PROGRAM, COMPUTER-READABLE MEDIUM, CONTROL ARRANGEMENT, AND VEHICLE

CROSS-REFERENCE TO RELATED APPLICATIONS

This application claims priority to Swedish Patent Application No. 2351234-6 filed Oct. 30, 2023, of the same title; the contents of which are hereby incorporated by reference.

TECHNICAL FIELD

The present disclosure relates to a method of controlling operation of a vehicle. The present disclosure further relates to a computer program, a computer-readable medium, a control arrangement configured to control operation of a vehicle, as well as a vehicle comprising a control arrangement.

BACKGROUND

Wheeled vehicles such as passenger cars, trucks, buses, and the like, typically comprise a number of wheel axles and a set of wheels arranged at each of the number of wheel axles. Vehicles commonly comprise wheel brakes controllable to brake the wheels arranged at each of the number of wheel axles of the vehicle. Sometimes referred to as foundation brakes or service brakes, wheel brakes are crucial for vehicle safety, enabling controlled deceleration and bringing the vehicle to a complete stop when needed.

Typically, vehicles use either disc brakes, which involve a rotor and callipers, or drum brakes, which use a drum and a set of brake shoes. Wheel brakes are controllable to brake the vehicle, for example via a brake pedal arranged in a driver environment of the vehicle and/or via an at least partially autonomous braking system. Normally, hydraulic or pneumatic fluid engages brake pads and rotors or brake shoes and drums of the wheel brakes, generating friction to slow down the rotation of the wheels and accordingly also to slow down the vehicle.

One critical aspect of the brake performance of wheel brakes is temperature. The friction between brake pads and rotors or brake shoes and drums generates heat. In moderate conditions, this heat is dissipated into the surrounding air. However, during intense or prolonged braking, such as when the vehicle is descending a steep downhill slope, the temperature can rise significantly, leading to a condition known as brake fade. Brake fade is the reduction in stopping power that occurs when the brake components overheat. Elevated temperatures can cause the brake pad material to degrade, reducing its frictional properties. In extreme cases, the braking effectiveness can be severely diminished. Furthermore, wheel brakes can undergo substantial wear and tear and are susceptible to damage if subjected to overheating.

Auxiliary braking systems in heavier vehicles like trucks and buses serve as secondary braking systems that work alongside with the conventional wheel brakes of the vehicle. Auxiliary braking systems typically generate resistance within the engine or driveline to slow down the vehicle. Common types include engine brakes, which adjust engine valve timing; exhaust brakes that restrict the flow of exhaust gases, creating back pressure; and hydraulic or electromagnetic retarders or machines, which create drag in the driveline of the vehicle. Moreover, in at least partially electric vehicles, an electric motor of the vehicle can also serve to brake the vehicle.

These auxiliary braking systems are useful for slowing down on steep grades, helping to prevent brake overheating and extending the lifespan of the wheel brakes. However, they are normally not meant for complete stops and should be used in conjunction with the main braking system for optimal safety and performance.

Some auxiliary braking systems are regenerative braking systems designed to recapture energy during vehicle deceleration. Regenerative braking system exist in various forms across different vehicles. In at least partially electric vehicles, such as fully electric and hybrid electric vehicles, one common approach is to store at least a portion of the electricity generated by the electric motor during braking in an electric energy storage system of the vehicle. The electric energy storage system may comprise a number of batteries and/or a number of supercapacitors. The stored energy can subsequently be used to propel the vehicle, and/or to power other systems of the vehicle, thus enhancing the overall energy efficiency of the vehicle. Another type of auxiliary braking system employs flywheel energy storage, which harnesses the braking energy to spin a flywheel, which can then release this energy to assist in propelling the vehicle during acceleration. Moreover, hydraulic regenerative systems, especially prevalent in some larger vehicles like buses, store energy by pressurizing hydraulic fluid, which can later be used to aid in propulsion of the vehicle.

The braking capacity of auxiliary braking systems can exhibit significant variability during vehicle operation. For instance, in engine brakes, the braking capacity is influenced by numerous factors, including the engine's rotational speed and temperature. Similarly, the braking capacity of hydraulic or electromagnetic retarders may decline notably after prolonged use, potentially due to excessive temperatures within the auxiliary braking system.

Furthermore, the braking capacity of many regenerative braking systems can be significantly diminished when their energy storage systems have only a small remaining capacity for storing energy. For instance, if the state of charge level of an electric storage system within an electric regenerative braking system reaches 100%, it cannot absorb any additional electricity, which significantly compromises the braking capacity of the electric regenerative braking system.

One way to address the issue of reduced braking capacity in an electric regenerative braking system could involve abstaining from fully charging the energy storage system. However, this approach clearly restricts the vehicle's operational range. Furthermore, in the context of hybrid electric vehicles, it reduces the electric-only driving range, necessitating an earlier activation of the combustion engine than if the energy storage system had been fully charged.

As underscored above, when an auxiliary braking system experiences diminished braking power, the vehicle's wheel brakes are obligated to compensate for the lack of braking power, thereby becoming especially susceptible to overheating. Furthermore, as indicated above, ensuring the functionality of the wheel brakes is important for maintaining the vehicle's operational safety.

SUMMARY

It is an object of the present invention to overcome, or at least alleviate, at least some of the above-mentioned problems and drawbacks. The object is achieved by the subject-matter of the appended independent claim(s).

According to a first aspect of the present disclosure, the object is achieved by a method of controlling operation of a vehicle, wherein the method is performed by a control arrangement, and wherein the vehicle comprises a number of wheel axles each comprising a set of wheels and wheel brakes controllable to brake the set of wheels, and an auxiliary braking system controllable to brake the vehicle, wherein one or more of the number of wheel axles is a liftable wheel axle being controllable between a lifted position and a lowered position. The method comprises the step of:

controlling at least one of the one or more liftable wheel axles from the lifted position to the lowered position if the at least one liftable wheel axle is in the lifted position and a ratio between an estimated braking capacity of the auxiliary braking system and a current or impending braking need of the vehicle is below a first threshold ratio.

Thereby, a method is provided capable of enhancing the operational safety of the vehicle. This is because the control of the at least one of the one or more liftable wheel axles to the lowered position ensures that the wheel brakes of the least one of the one or more liftable wheel axles can be utilized to brake the vehicle when the ratio between the estimated braking capacity of the auxiliary braking system and the current or impending braking need of the vehicle declines below the first threshold ratio.

This not only augments the number of wheel brakes actively engaged in braking the vehicle but also increases the number of wheel brakes available for energy absorption during braking. Consequently, this reduces the per-wheel brake temperature increase, mitigating the risk of overheating any of the wheel brakes of the vehicle.

The ratio between the estimated braking capacity of the auxiliary braking system and the current or impending braking need of the vehicle serves as an indicator of potentially hazardous situations, with a higher risk of overheating of wheel brakes. That is, obviously, the ratio is reduced upon a reduction in estimated braking capacity of the auxiliary braking system and/or upon an increase in current or impending braking need of the vehicle.

Accordingly, by controlling the at least one of the one or more liftable wheel axles from the lifted position to the lowered position if the ratio is below the first threshold ratio, the additional braking power and thermal energy storage capacity of the wheel brakes of the at least one of the one or more liftable wheel axles can be utilized to brake the vehicle and provide additional energy absorption capacity in potentially hazardous situations that pose an elevated risk of wheel brake overheating.

Furthermore, since the method is capable of reducing the risk of wheel brake overheating, a method is provided capable of reducing wear and tear of wheel brakes of the vehicle, as well as the risk of damage of the wheel brakes of the vehicle.

Accordingly, a method is provided overcoming, or at least alleviating, at least some of the above-mentioned problems and drawbacks. As a result, the above-mentioned object is achieved.

Optionally, the method comprises the step of:

estimating the current or impending braking need of the vehicle based on inclination data representative of an inclination of a current and/or upcoming downhill slope of a road section on which the vehicle is/will be travelling.

Thereby, a method is provided capable of estimating the current or impending braking need of the vehicle in an efficient and reliable manner. As a further result, a method is provided capable of further enhancing the operational safety of the vehicle as well as reducing wear and tear on the wheel brakes and reducing the risk of damage to them.

Optionally, the method comprises the step of:

estimating the current or impending braking need of the vehicle based on a distance to a preceding vehicle.

Thereby, a method is provided capable of estimating the current or impending braking need of the vehicle in an efficient and reliable manner. As a further result, a method is provided capable of further enhancing the operational safety of the vehicle, while also mitigating wear and tear on the wheel brakes and minimizing the potential for damage to them.

Optionally, the auxiliary braking system is a regenerative braking system configured to store energy derived from braking in an energy storage system of the vehicle, and wherein the method comprises the step of:

estimating the braking capacity of the auxiliary braking system based on an energy storing capacity of the energy storage system.

Thereby, a method is provided capable of estimating the braking capacity of the auxiliary braking system in a simple, efficient, and reliable manner. As a further result, a method is provided capable of further enhancing the operational safety of the vehicle, while also mitigating wear and tear on the wheel brakes and minimizing the potential for damage to them.

In addition, a method is provided capable of circumventing, or at least reducing, the need for abstaining from fully charging the energy storage system during a charging session. In this manner, unwarranted reductions in the available operational range can be avoided. Moreover, conditions are provided for enhancing the energy-efficiency of the vehicle.

Optionally, the auxiliary braking system is an electric regenerative braking system comprising an electric machine controllable to brake the vehicle, and wherein the energy storage system is an electric energy storage system, and wherein the step of estimating the braking capacity of the auxiliary braking system comprises:

estimating the braking capacity of the auxiliary braking system based on a state of charge of the energy storage system.

Thereby, a method is provided capable of estimating the braking capacity of the auxiliary braking system in a simple, efficient, and reliable manner. As a further result, a method is provided capable of further enhancing the operational safety of the vehicle, while also mitigating wear and tear on the wheel brakes and minimizing the potential for damage to them.

In addition, a method is provided capable of circumventing, or at least reducing, the need for abstaining from fully charging the electric energy storage system during a charging session. In this manner, unwarranted reductions in the available operational range can be avoided. Moreover, conditions are provided for enhancing the energy-efficiency of the vehicle.

Optionally, the auxiliary braking system is a regenerative braking system configured to store energy derived from braking in an energy storage system of the vehicle, and wherein the method comprises the step of:

estimating the braking capacity of the auxiliary braking system based on a temperature estimate of the energy storage system.

Thereby, a method is provided capable of estimating the braking capacity of the auxiliary braking system in a simple, efficient, and reliable manner. As a further result, a method is provided capable of further enhancing the operational safety of the vehicle, while also mitigating wear and tear on the wheel brakes and minimizing the potential for damage to them.

Optionally, the method comprises the steps of:

adjusting the first threshold ratio based on a temperature estimate of the wheel brakes of the vehicle.

Thereby, a method is provided having conditions for further enhancing the operational safety of the vehicle as well as reducing wear and tear on the wheel brakes and reducing the risk of damage to them in potentially hazardous situations. Moreover, a method is provided having conditions for avoiding unnecessary control of the at least one of the one or more liftable wheel axles to the lowered position when the temperature estimate of the wheel brakes of the vehicle indicates sufficient available braking capacity of the wheel brakes of the remaining wheel axles of the vehicle.

Optionally, the method comprises the step of:

controlling the at least one liftable wheel axle from the lowered position to the lifted position when the ratio between the estimated braking capacity and the estimated braking need exceeds a second threshold ratio, wherein the second threshold ratio is greater than the first threshold ratio.

Thereby, a method is provided capable of sustaining a high energy efficiency of the vehicle while concurrently ensuring enhanced operational safety. This is achieved through controlling the at least one liftable wheel axle from the lowered position to the lifted position, which can minimize parasitic losses induced by said liftable wheel axle. The enhanced operational safety of the vehicle can be ensured because the second threshold ratio can be set to a level deemed safe considering estimated braking capacities and the estimated braking needs.

According to a second aspect of the present disclosure, the object is achieved by a computer program comprising instructions to cause the control arrangement according to the second aspect of the present disclosure to execute the steps of the method according to some embodiments of the first aspect of the present disclosure. Since the computer program comprises instructions to cause the control arrangement to carry out the method according to some embodiments described herein, a computer program is provided which provides conditions for overcoming, or at least alleviating, at least some of the above-mentioned drawbacks. As a result, the above-mentioned object is achieved.

According to a third aspect of the present disclosure, the object is achieved by a computer-readable medium having stored thereon the computer program according to the third aspect of the present disclosure. Since the computer-readable medium comprises instructions to cause the control arrangement to carry out the method according to some embodiments described herein, a computer-readable medium is provided which provides conditions for overcoming, or at least alleviating, at least some of the above-mentioned drawbacks. As a result, the above-mentioned object is achieved.

According to a fourth aspect of the present disclosure, the object is achieved by a control arrangement configured to control operation of a vehicle, and wherein the vehicle comprises a number of wheel axles each comprising a set of wheels and wheel brakes controllable to brake the set of wheels, and an auxiliary braking system controllable to brake the vehicle, wherein one or more of the number of wheel axles is a liftable wheel axle being controllable between a lifted position and a lowered position. The control arrangement is configured to:

control at least one of the one or more liftable wheel axles from the lifted position to the lowered position if the at least one liftable wheel axle is in the lifted position and a ratio between an estimated braking capacity of the auxiliary braking system and a current or impending braking need of the vehicle is below a first threshold ratio.

Thereby, a control arrangement is provided capable of enhancing the operational safety of the vehicle. This is because the control of the at least one of the one or more liftable wheel axles to the lowered position ensures that the wheel brakes of the least one of the one or more liftable wheel axles can be utilized to brake the vehicle when the ratio between the estimated braking capacity of the auxiliary braking system and the current or impending braking need of the vehicle declines below the first threshold ratio.

This not only augments the number of wheel brakes actively engaged in braking the vehicle but also increases the number of wheel brakes available for energy absorption during braking. Consequently, this reduces the per-wheel brake temperature increase, mitigating the risk of overheating any of the wheel brakes of the vehicle.

The ratio between the estimated braking capacity of the auxiliary braking system and the current or impending braking need of the vehicle serves as an indicator of potentially hazardous situations, with a higher risk of overheating of wheel brakes. That is, obviously, the ratio is reduced upon a reduction in estimated braking capacity of the auxiliary braking system and/or upon an increase in current or impending braking need of the vehicle.

Accordingly, by controlling the at least one of the one or more liftable wheel axles from the lifted position to the lowered position if the ratio is below the first threshold ratio, the additional braking power and thermal energy storage capacity of the wheel brakes of the at least one of the one or more liftable wheel axles can be utilized to brake the vehicle and provide additional energy absorption capacity in potentially hazardous situations that pose an elevated risk of wheel brake overheating.

Furthermore, since the control arrangement is capable of reducing the risk of wheel brake overheating, a control arrangement is provided capable of reducing wear and tear of wheel brakes of the vehicle, as well as the risk of damage of the wheel brakes of the vehicle.

Accordingly, a control arrangement is provided overcoming, or at least alleviating, at least some of the above-mentioned problems and drawbacks. As a result, the above-mentioned object is achieved.

It will be appreciated that the various embodiments described for the method are all combinable with the control arrangement as described herein. That is, the control arrangement according to the fourth aspect of the present disclosure may be configured to perform any one of the method steps of the method according to the first aspect of the present disclosure.

According to a fifth aspect of the present disclosure, the object is achieved by a vehicle comprising a number of wheel axles each comprising a set of wheels and wheel brakes controllable to brake the set of wheels, and an auxiliary braking system controllable to brake the vehicle, wherein one or more of the number of wheel axles is a liftable wheel axle being controllable between a lifted position and a lowered position. The vehicle comprises a control arrangement configured to:

control at least one of the one or more liftable wheel axles from the lifted position to the lowered position if the at least one liftable wheel axle is in the lifted position and a ratio between an estimated braking capacity of the auxiliary braking system and a current or impending braking need of the vehicle is below a first threshold ratio.

Thereby, a vehicle is provided comprising a control arrangement capable of enhancing the operational safety of the vehicle, reducing the risk of wheel brake overheating, while also mitigating wear and tear on the wheel brakes and minimizing the potential for damage to them.

Thereby, a vehicle is provided overcoming, or at least alleviating, at least some of the above-mentioned problems and drawbacks. As a result, the above-mentioned object is achieved.

Optionally, the vehicle is a heavy road vehicle, such as a truck or a bus. Thereby, a heavy road vehicle is provided having at least some of the above-mentioned advantages.

Further features of, and advantages with, the present invention will become apparent when studying the appended claims and the following detailed description.

BRIEF DESCRIPTION OF THE DRAWINGS

Various aspects of the present disclosure, including its particular features and advantages, will be readily understood from the example embodiments discussed in the following detailed description and the accompanying drawings, in which.

DETAILED DESCRIPTION

Aspects of the present disclosure will now be described more fully. Like reference signs refer to like elements throughout. Well-known functions or constructions will not necessarily be described in detail for brevity and/or clarity.

Figure 1:
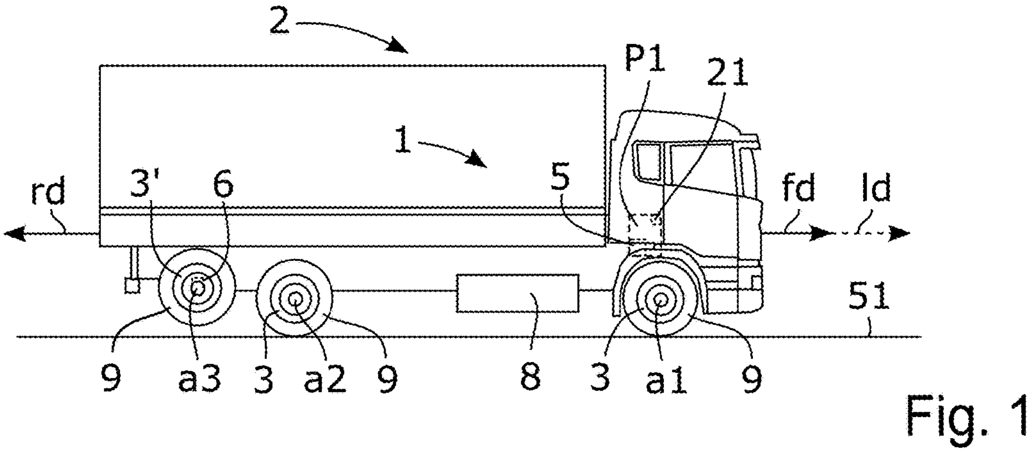
FIG. 1 schematically illustrates a vehicle according to some embodiments.

FIG. 1 schematically illustrates a vehicle 2 according to some embodiments. According to the illustrated embodiments, the vehicle 2 is a truck, i.e., a type of heavy road vehicle as well as a type of heavy commercial vehicle. According to further embodiments, the vehicle 2, as referred to herein, may be another type of heavy or lighter type of manned or unmanned vehicle for land-based propulsion such as a lorry, a bus, a construction vehicle, a tractor, a car, or the like.

In FIG. 1, the vehicle 2 is illustrated as comprising three wheel axles a1, a2, a3. In some places below, the wheel axles a1, a2, a3 of the vehicle 2 are referred to as a first wheel axle a1, a second wheel axle a2, and a third wheel axle a3. According to further embodiments, the vehicle 2 may comprise another number of wheel axles a1, a2, a3, such as four or five wheel axles. As is further explained herein, each wheel axle a1, a2, a3 of the vehicle 2 comprises a set of wheels 9 arranged at the wheel axle a1, a2, a3 and wheel brakes 3, 3' controllable to brake the set of wheels 9 of the wheel axle a1, a2, a3.

The wheel brakes 3, 3' may comprise friction brake arrangements, such as drum brakes, disc brakes, or a combination thereof. Drum brakes normally comprise a cylinder-shaped part called a brake drum and a set of shoes or pads controllable to be pressed against the cylinder-shaped part to create friction therebetween for braking rotation of the wheels 9. Disc brakes normally comprise a disc and a set of pads controllable to be pressed against the disc to create friction therebetween for braking rotation of the wheels 9.

According to the illustrated embodiments, the vehicle 2 comprises two wheels 9 arranged at the first wheel axle a1 and four wheels 9 arranged at each of the second wheel axle a2 and the third wheel axle a3. However, according to further embodiments, the vehicle 2 may comprise another number of wheels 9 arranged at the wheel axles a1, a2, a3 thereof, such as two or more wheels 9 arranged at each wheel axle a1, a2, a3 of the vehicle 2.

In FIG. 1, a forward moving direction fd and a reverse moving direction rd are indicated. The reverse moving direction rd of the vehicle 2 is opposite to the forward moving direction fd of the vehicle 2. Furthermore, in FIG. 1, a longitudinal direction Id of the vehicle 2 is indicated. The longitudinal direction Id of the vehicle 2 is parallel to each of the forward moving direction fd and the reverse moving direction rd of the vehicle 2.

According to the illustrated embodiments, the first wheel axle a1 constitutes a front wheel axle and the wheels 9 thereof thus constitute front wheels of the vehicle 2. Moreover, according to the illustrated embodiments, each of the second and third wheel axle a2, a3 can be said to constitute a rear wheel axle and the wheels 9, 9 thereof can be said to constitute rear wheels of the vehicle 2. According to the embodiments illustrated in FIG. 1, the second and third wheel axles a2, a3 are arranged relatively close to each other and can be said to together form a tandem axle of the vehicle 2.

The vehicle 2 comprises a powertrain P1 configured to provide motive power to the vehicle 2 to the vehicle 2 via wheels 9 of the vehicle 2. In more detail, according to the illustrated embodiments, the powertrain P1 is configured to provide motive power to the vehicle 2 via wheels 9 of the second wheel axle a2. In other words, according to the illustrated embodiments, the second wheel axle a2 is a driven wheel axle whereas each of the first and third wheel axles is a non-driven wheel axle. According to further embodiments, the vehicle 2 may comprise another configuration of driven and non-driven wheel axles.

Moreover, according to the illustrated embodiments, the wheels 9 of the first wheel axle a1 are steered wheels whereas the wheels 9, 9 of the second and third wheel axle a2, a3 are non-steered wheels. The feature that the wheels 9 of the first wheel axle a1 are steered wheels means that the vehicle 2 comprises a steering system controllable to change a rolling direction of the number of wheels 9 relative to the chassis of the vehicle 2. However, according to further embodiments, the vehicle 2 may comprise another configuration of wheels 9 and wheel axles a1, a2, a3 than depicted in FIG. 1.

Moreover, according to the illustrated embodiments, the powertrain P1 is a pure electric powertrain comprising an electric machine 5 configured to provide motive power to the vehicle 2 via wheels 9 of the vehicle 2 and an energy storage system 8 configured to provide electricity to the electric machine 5 during operation of the vehicle 2. The electric machine 5 may also be referred to as an electric propulsion machine. According to the illustrated embodiments, the energy storage system 8 of the vehicle 2 is an electric energy storage system which may comprise one or more propulsion battery packs each comprising a number of rechargeable battery cells, such as lithium-ion battery cells, lithium polymer batteries cells, nickel-metal hydride battery cells, or the like. The battery cells may be arranged in battery modules, wherein each of the one or more propulsion battery packs may comprise a number of battery modules.

According to the illustrated embodiments, the electric machine 5 is controllable to brake the vehicle 2 and to convert the braking energy into electric energy. The electric energy derived from braking is stored in the energy storage system 8 of the vehicle 2. Therefore, the electric machine 5 and the energy storage system 8 of the vehicle 2 can be said to form part of a regenerative auxiliary braking system 1 of the vehicle 2, wherein the regenerative auxiliary braking system 1 is controllable to brake the vehicle 2. The feature that the auxiliary braking system 1 is a regenerative braking system means that the auxiliary braking system 1 is configured to store energy derived from braking in an energy storage system 8 of the vehicle 2, wherein the stored energy can subsequently be used to provide motive power to the vehicle 2, and/or can be used to power one or more other types of systems or arrangements of the vehicle 2.

According to some embodiments, the vehicle 2 may comprise another type of regenerative auxiliary braking system than explained above, such as a hydraulic regenerative auxiliary braking system. Such an auxiliary braking system may comprise a hydraulic pump/motor controllable to brake the vehicle 2 and to convert the braking energy into potential energy within a pressure tank by pumping a fluid into the pressure tank upon braking, wherein the pressurized fluid can be utilized subsequently for providing motive power to the vehicle 2, for example using the pump/motor of the hydraulic regenerative auxiliary braking system.

According to still further embodiments, the vehicle 2 may comprise another type of auxiliary braking system 1 controllable to brake the vehicle 2, such as a hydraulic retarder or an electromagnetic retarder. Such an auxiliary braking system may not fall within the category regenerative auxiliary braking system according to the above described.

Furthermore, according to some embodiments, the vehicle 2 may comprise an internal combustion engine. The internal combustion engine may be arranged in addition to the electric machine 5, or as an alternative to electric machine 5, for providing motive power to the vehicle 2 via wheels 9 of the vehicle 2. According to such embodiments, the vehicle 2 may comprise an auxiliary braking system in the form of an engine brake and/or an exhaust brake. An engine brake, often known as a "Jake brake," is configured to modify the valve operation within an engine, converting it into a power-absorbing air compressor to resist engine rotation and thereby brake the vehicle 2. An exhaust brake functions by creating back pressure in an exhaust system of the engine, typically using an exhaust throttle arranged in the exhaust system, which in turn provides resistance against the engine's pistons to resist engine rotation and thereby brake the vehicle 2.

According to the embodiments illustrated in FIG. 1, one of the wheel axles a1, a2, a3 of the vehicle 2 is a liftable wheel axle a3, namely the third wheel axle a3 referred to above. According to further embodiments, the vehicle 2 may comprise three wheel axles a1, a2, a3, wherein the second wheel axle a2 is a liftable wheel axle. Moreover, as indicated above, according to some embodiments, the vehicle 2 may comprise more than three wheel axles a1, a2, a3. According to such embodiments, the vehicle 2 may comprise more than one liftable wheel axle a3.

The liftable wheel axle a3 is controllable between a lifted position and a lowered position. In FIG. 1, the liftable wheel axle a3 is depicted in the lifted position and the vehicle 2 is illustrated as positioned in an intended use position on the flat surface 51. In the lifted position, no ground engaging contact is obtained between the wheels 9 of the liftable wheel axle a3 and flat surface 51 supporting the vehicle 2 when the vehicle 2 is positioned in the intended use position on the flat surface 51. Instead, when the liftable wheel axle a3 is in the lifted position and the vehicle 2 is positioned in the intended use position on the flat surface 51, the ground engagement is solely established between the wheels 9 of the first and second wheel axles a1, a2 and the flat ground surface 51. The lifted position may also be referred to as a raised position.

The vehicle 2 comprises a suspension mechanism 6 controllable to move the liftable wheel axle a3 between the lifted and lowered positions. The suspension arrangement 6 may comprise one or more pneumatic, hydraulic, or electric actuators for moving the liftable wheel axle a3 between the lifted and lowered positions.

In heavy vehicles, such as trucks or buses, a liftable wheel axle a3 can be employed to manage and optimize axle load distribution and enhance energy efficiency. The liftable wheel axle a3 can be lowered to the ground thereby, engaging its wheels 9 with the flat surface 51 when the vehicle 2 is fully loaded or carrying heavy cargo. This action distributes the load among all wheel axles a1, a2, a3 of the vehicle 2, which can ensure compliance with legal axle weight limits and enhancing vehicular stability.

Conversely, when vehicle 2 is lightly loaded or empty, the liftable wheel axle a3 can be raised into the lifted position illustrated in FIG. 1, eliminating contact between its wheels 9 and the flat surface 51. This is beneficial because it reduces rolling resistance and, consequently, enhances energy efficiency. Furthermore, a liftable wheel axle a3 can minimize tire wear and tear on the non-engaged wheels 9, providing a long-term reduction in maintenance costs. In certain configurations, employing a liftable wheel axle a3 enables the adaptation of the vehicle 2 to varying load conditions, thereby optimizing operational costs and maintaining compliance with road-use regulations.

As can be seen in FIG. 1, according to the illustrated embodiments, the vehicle 2 comprises a control arrangement 21. The control arrangement 21 is configured to control operation of a vehicle 2. In more detail, according to embodiments herein, the control arrangement 21 is configured to control the liftable wheel axle a3 from the lifted position to the lowered position if the liftable wheel axle a3 is in the lifted position and a ratio between an estimated braking capacity of the auxiliary braking system 1 and a current or impending braking need of the vehicle 2 is below a first threshold ratio.

In embodiments in which the vehicle 2 comprises more than one liftable wheel axle a3, the control arrangement 21 may be configured to control at least one of the liftable wheel axles a3 from the lifted position to the lowered position if the at least one liftable wheel axle a3 is in the lifted position and the ratio between an estimated braking capacity of the auxiliary braking system 1 and the current or impending braking need of the vehicle 2 is below a first threshold ratio.

Figure 2:
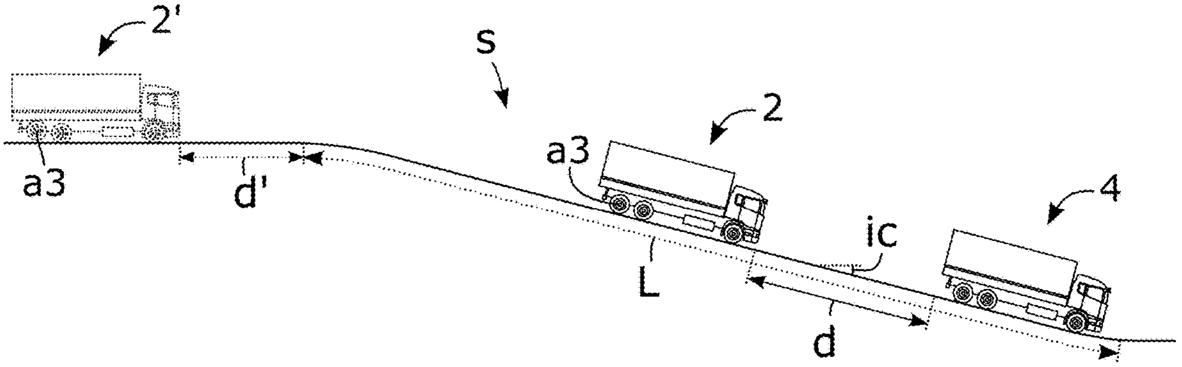
FIG. 2 schematically illustrates the vehicle illustrated in FIG. 1 as travelling along a downhill slope of a road section, FIG. 3 schematically illustrates a method of controlling operation of a vehicle.

FIG. 2 schematically illustrates the vehicle 2 illustrated in FIG. 1 as travelling along a downhill slope s of a road section. Moreover, FIG. 2 illustrates a preceding vehicle 4 and a dotted schematic representation of the vehicle 2' at an earlier position along the road section.

In FIG. 2, the liftable wheel axle a3 of the vehicle 2 is illustrated in the lowered position whereas the liftable wheel axle a3 of the dotted schematic representation of the vehicle 2', at the earlier position along the road section, is illustrated in the lifted position. The vehicle 2' is illustrated as located at a distance d' from the downhill slope s at the earlier position along the road section. Below, simultaneous reference is made to FIG. 1 and FIG. 2, if not indicated otherwise.

The ratio between the estimated braking capacity of the auxiliary braking system 1 and the current or impending braking need of the vehicle 2' can be assumed to decline below the first threshold ratio at the earlier position along the road section illustrated in FIG. 2. Since the liftable wheel axle a3 is in the lifted position at this earlier position, the control arrangement 21 initiates a control of the liftable wheel axle a3 from the lifted position towards the lowered position when the vehicle 2' is at the earlier position in this scenario.

By controlling the liftable wheel axle a3 from the lifted position towards the lowered position, a ground engaging contact is obtained between the wheels 9 of the liftable wheel axle a3 and a road surface of the road section. The ground engaging contact between the wheels 9 of the liftable wheel axle a3 and the road surface causes rotation of the wheels 9 of the liftable wheel axle a3 and the wheel brakes 3' of the liftable wheel axle a3 can thereby be utilized for braking the vehicle 2 in addition to the wheel brakes 3 of the first and second wheel axles a1, a2 of the vehicle 2.

This not only augments the number of wheel brakes 3, 3' actively engaged in braking the vehicle 2 but also increases the number of wheel brakes 3, 3' available for energy absorption during braking. Consequently, this reduces the per-wheel brake temperature increase, which mitigates the risk of overheating any of the wheel brakes 3, 3' of the vehicle 2.

The ratio between the estimated braking capacity of the auxiliary braking system 1 and the current or impending braking need of the vehicle 2 serves as an indicator of potentially hazardous situations, with a higher risk of overheating of wheel brakes 3, 3'. That is, obviously, the ratio is reduced upon a reduction in estimated braking capacity of the auxiliary braking system 1 and/or upon an increase in current or impending braking need of the vehicle 2.

Accordingly, by controlling the liftable wheel axle a3 from the lifted position to the lowered position if the ratio is below the first threshold ratio, the additional braking power and thermal energy storage capacity of the wheel brakes 3, 3' of the liftable wheel axle a3 can be utilized in potentially hazardous situations that pose an elevated risk of wheel brake overheating.

Furthermore, since the control arrangement 21 according to embodiments herein is capable of reducing the temperature increase in each wheel brake 3, 3' of the vehicle 2, the control arrangement 21 is capable of reducing wear and tear of wheel brakes 3, 3' of the vehicle 2, as well as the risk of damage of the wheel brakes 3, 3' of the vehicle 2.

The control arrangement 21 may be configured to estimate the current or impending braking need of the vehicle 2, and/or may be configured to receive an estimate of the current or impending braking need of the vehicle 2 from a separate device or system.

According to some embodiments, the current or impending braking need of the vehicle 2 may be estimated based on inclination data representative of an inclination ic of a current and/or upcoming downhill slope s of a road section on which the vehicle 2 is/will be travelling. The control arrangement 21 may be configured to obtain the inclination data representative of an inclination ic of a current road section on which the vehicle 2 is travelling by inputting the inclination data from one or more inclinometers, accelerometers, or gyroscopes, arranged on the vehicle 2. As an alternative, or in addition, the control arrangement 21 may be configured to obtain the inclination data representative of an inclination ic of a current and/or upcoming road section on which the vehicle 2 is/will be travelling by comparing current positioning data of the vehicle 2 and map data. The map data may be obtained from an onboard system of the vehicle 2 or from an external device or network. The vehicle 2 may comprise a positioning unit, such as a satellite-based navigation system, configured to provide the current positioning data of the vehicle 2.

The current or impending braking need of the vehicle 2 may be quantified by a value indicative of an estimated required braking energy, potentially expressed in joules. Alternatively, or additionally, the current or impending braking need of the vehicle 2 may be quantified by a value indicative of an estimated required power needed for braking, which may be expressed in terms of joules per second (or watts). The current or impending braking need of the vehicle 2 may be estimated based on the inclination data in a manner such that that an increase in the current or impending inclinations ic leads to an increase in the current or impending braking need of the vehicle 2, and vice versa.

As an alternative, or in addition, the control arrangement 21 is configured to estimate the current or impending braking need of the vehicle 2 based on a distance d to a preceding vehicle 4. The control arrangement 21 may be configured to obtain distance data representative of a distance d to a preceding vehicle 4. Moreover, the vehicle 2 may comprise a sensor assembly configured to provide distance data representative of the distance d to the preceding vehicle 4. According to such embodiments, the control arrangement 21 is configured to obtain the distance data from the sensor assembly. The sensor assembly may comprise one or more of a radar (Radio Detection and Ranging) unit, a lidar (Light Detection and Ranging) unit, and a camera. The sensor assembly may be arranged at a front section of the vehicle 2.

The current or impending braking need of the vehicle 2 may be estimated based on the distance d to a preceding vehicle 4 in a manner such that decreasing distances d to a preceding vehicle 4 increase the current or impending braking need of the vehicle 2, and vice versa.

As further alternatives, or in addition, the control arrangement 21 may be configured to estimate the current or impending braking need of the vehicle 2 based on one or more of a current speed of the vehicle 2, a desired speed of the vehicle 2, a length L of a downhill slope s of a road section the vehicle 2 is/will be travelling, a current weight or weight estimate of the vehicle 2, a current speed of a preceding vehicle 4, a current or impending curvature of a road section on which the vehicle 2 is/will be travelling, a current or impending traffic situation on a road section on which the vehicle 2 is/will be travelling, a detection or input of a traffic signal, and a current or impending speed limit of a road section on which the vehicle 2 is/will be travelling.

According to some embodiments, the control arrangement 21 may be configured to estimate the braking capacity of the auxiliary braking system 1. The braking capacity of the auxiliary braking system 1 as referred to herein may also be referred to as a current available braking capacity of the auxiliary braking system 1 or a current remaining braking capacity of the auxiliary braking system 1. The braking capacity of the auxiliary braking system 1 may be quantified by a value indicative of a current available braking energy capacity of the auxiliary braking system 1, potentially expressed in joules. Alternatively, or additionally, the braking capacity of the auxiliary braking system 1 may be quantified by a value indicative of a current available braking power capacity of the auxiliary braking system 1, which may be expressed in terms of joules per second (or watts).

As mentioned, according to the illustrated embodiments, the auxiliary braking system 1 is a regenerative braking system configured to store energy derived from braking in an energy storage system 8 of the vehicle 2. According to these embodiments, the control arrangement 21 may be configured to estimate the braking capacity of the auxiliary braking system 1 based on an energy storing capacity of the energy storage system 8. That is, in more detail, according to the illustrated embodiments, the auxiliary braking system 1 is an electric regenerative braking system comprising an electric machine 5 controllable to brake the vehicle 2, and wherein the energy storage system 8 is an electric energy storage system. According to these embodiments, the control arrangement 21 may be configured to estimate the braking capacity of the auxiliary braking system 1 based on a state of charge of the energy storage system 8.

That is, as mentioned herein, the braking capacity of an auxiliary braking system 1 can be significantly diminished when the energy storage system 8 has only a small remaining capacity for storing energy. For instance, if the state of charge level of the energy storage system 8 reaches 100%, the energy storage system 8 cannot absorb any additional electricity, which significantly compromises the braking capacity of the auxiliary braking system 1.

Thus, by estimating the braking capacity of the auxiliary braking system 1 based on the state of charge of the energy storage system 8 and by controlling the liftable wheel axle a3 to the lowered position in case the ratio between the estimated braking capacity of the auxiliary braking system 1 and the current or impending braking need of the vehicle 2 declines below the first threshold ratio, the risk of overheating of the wheel brakes 3, 3' is reduced in such potentially hazardous situations.

The control arrangement 21 may be configured to estimate the braking capacity of the auxiliary braking system 1 based on a state of charge of the energy storage system 8 in a manner such that increases in the state of charge of the energy storage system 8 reduce the estimated braking capacity of the auxiliary braking system 1, and vice versa.

According to some embodiments, the control arrangement 21 is configured to estimate the braking capacity of the auxiliary braking system 1 based on a temperature estimate of the energy storage system 8. The control arrangement 21 may be configured to obtain the temperature estimate of the energy storage system 8 from one or more temperature sensors arranged in thermal contact with the energy storage system 8. Alternatively, or additionally, the control arrangement 21 may be configured to obtain the temperature estimate of the energy storage system 8 by analysing data representative of one or more of a current or preceding flow of energy into/out of the energy storage system 8, a current ambient temperature, a current temperature of coolant configured to cool the energy storage system 8, and the like.

The control arrangement 21 may be configured to estimate the braking capacity of the auxiliary braking system 1 based on the temperature estimate of the energy storage system 8 in a manner such that increasing temperature estimates of the energy storage system 8 reduce the estimated braking capacity of the auxiliary braking system 1, and vice versa.

According to some embodiments, the control arrangement 21 may be configured to adjust the first threshold ratio based on a temperature estimate of the wheel brakes 3, 3' of the vehicle 2. According to such embodiments, the control arrangement 21 may be configured to increase the first threshold ratio with increasing temperature estimates of the wheel brakes 3, 3' of the vehicle 2 and may be configured to reduce the first threshold ratio with reducing temperature estimates of the wheel brakes 3, 3' of the vehicle 2.

In this manner, the ratio between the estimated braking capacity of the auxiliary braking system 1 and the current or impending braking need of the vehicle 2 is more likely decline below the first threshold ratio upon higher temperature estimates of the wheel brakes 3, 3' and is less likely decline below the first threshold ratio upon lower temperature estimates of the wheel brakes 3, 3'.

The control arrangement 21 may be configured to obtain the temperature estimate of the wheel brakes 3, 3' of the vehicle 2 from one or more temperature sensors arranged in thermal contact with one or more wheel brakes 3, 3' of the vehicle 2. Alternatively, or additionally, the control arrangement 21 may be configured to obtain the temperature estimate of the wheel brakes 3, 3' of the vehicle 2 by analysing data representative of one or more of a current or preceding use of the wheel brakes 3, 3', a current or preceding ambient temperature, a current or preceding inclination of a road section the vehicle 2 is/has been travelling, and the like.

According to some embodiments, the control arrangement 21 may be configured to control the liftable wheel axle a3 from the lowered position to the lifted position when the ratio between the estimated braking capacity and the estimated braking need exceeds a second threshold ratio, wherein the second threshold ratio is greater than the first threshold ratio. In this manner, the control arrangement 21 is capable of sustaining a high energy efficiency of the vehicle 2 while concurrently ensuring enhanced operational safety. This is achieved through controlling the liftable wheel axle a3 from the lowered position to the lifted position, which can minimize parasitic losses induced by said liftable wheel axle a3. The enhanced operational safety of the vehicle 2 can be ensured because the second threshold ratio can be set to a level deemed safe considering estimated braking capacities and the estimated braking needs.

As understood from the above described, a ratio between the estimated braking capacity of the auxiliary braking system 1 and the current or impending braking need of the vehicle 2 assuming the value 1 (one) means that the estimated braking capacity of the auxiliary braking system 1 is equal to the current or impending braking need of the vehicle 2. Similarly, a ratio between the estimated braking capacity of the auxiliary braking system 1 and the current or impending braking need of the vehicle 2 assuming a value greater than 1 (one) means that the estimated braking capacity of the auxiliary braking system 1 is greater than the current or impending braking need of the vehicle 2. Moreover, obviously, a ratio between the estimated braking capacity of the auxiliary braking system 1 and the current or impending braking need of the vehicle 2 assuming a value smaller than 1 (one) means that the estimated braking capacity of the auxiliary braking system 1 is smaller than the current or impending braking need of the vehicle 2.

According to embodiments herein, the first threshold ratio, as referred to herein, may be set to a value between 1 and 5, or to a value between 1.5 and 3. As understood from the above described, in embodiments in which the first threshold ratio is set to a value of 5 (five), the control arrangement 21 will control the liftable wheel axles a3 from the lifted position to the lowered position if the liftable wheel axle a3 is in the lifted position and the estimated braking capacity of the auxiliary braking system 1 becomes less than five times greater than the current or impending braking need of the vehicle 2, and so on. Obviously, this can also be expressed as that in embodiments in which the first threshold ratio is set to a value of 5 (five), the control arrangement 21 will control the liftable wheel axles a3 from the lifted position to the lowered position if the liftable wheel axle a3 is in the lifted position and the current or impending braking need of the vehicle 2 becomes larger than a fifth of the estimated braking capacity of the auxiliary braking system 1, and so on. By setting the first threshold ratio to a value greater than 1 (one), a safety margin is provided ensuring that the control arrangement 21 controls the liftable wheel axles a3 from the lifted position to the lowered position before the estimated braking capacity of the auxiliary braking system 1 drops below the current or impending braking need of the vehicle 2. The second threshold ratio, as referred to herein, may be set to a value between 5 and 10, or to a value between 3 and 7.

Figure 3:
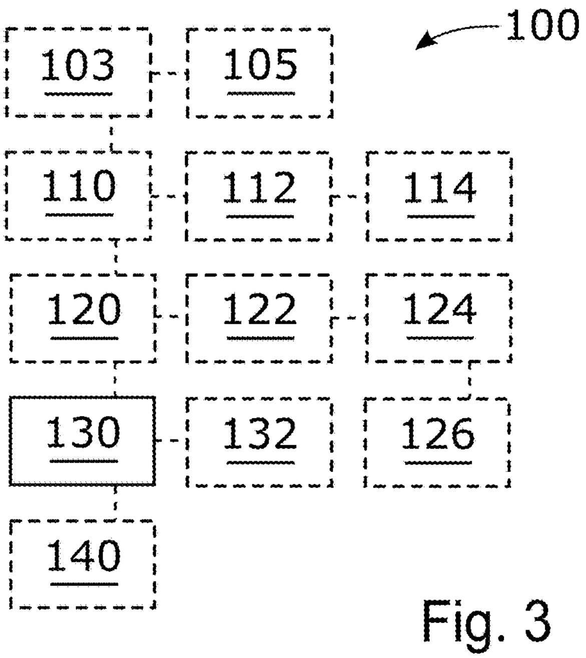

FIG. 3 schematically illustrates a method 100 of controlling operation of a vehicle. The vehicle may be a vehicle 2 according to the embodiments explained with reference to FIGS. 1 and 2. Therefore, below, simultaneous reference is made to FIG. 1-FIG. 3, if not indicated otherwise.

The method 100 is a method of controlling operation of a vehicle 2, wherein the method 100 is performed by a control arrangement 21, and wherein the vehicle 2 comprises a number of wheel axles a1, a2, a3 each comprising a set of wheels 9 and wheel brakes 3, 3' controllable to brake the set of wheels 9, and an auxiliary braking system 1 controllable to brake the vehicle 2, wherein one or more of the number of wheel axles a1, a2, a3 is a liftable wheel axle a3 being controllable between a lifted position and a lowered position. The method 100 comprises the step of:

controlling 130 at least one of the one or more liftable wheel axles a3 from the lifted position to the lowered position if the at least one liftable wheel axle a3 is in the lifted position and a ratio between an estimated braking capacity of the auxiliary braking system 1 and a current or impending braking need of the vehicle 2 is below a first threshold ratio.

Moreover, as indicated in FIG. 3, the method 100 may comprise the steps of:

estimating 110 the current or impending braking need of the vehicle 2, and estimating 120 the braking capacity of the auxiliary braking system 1.

Furthermore, as indicated in FIG. 3, the method 100 may comprise the step of:

estimating 112 the current or impending braking need of the vehicle 2 based on inclination data representative of an inclination ic of a current and/or upcoming downhill slope s of a road section on which the vehicle 2 is/will be travelling.

Moreover, as indicated in FIG. 3, the method 100 may comprise the step of:

estimating 114 the current or impending braking need of the vehicle 2 based on a distance d to a preceding vehicle 4.

Optionally, the auxiliary braking system 1 is a regenerative braking system configured to store energy derived from braking in an energy storage system 8 of the vehicle 2. According to such embodiments, the method 100 may comprise the step of:

estimating 122 the braking capacity of the auxiliary braking system 1 based on an energy storing capacity of the energy storage system 8.

Optionally, the auxiliary braking system 1 is an electric regenerative braking system comprising an electric machine 5 controllable to brake the vehicle 2, and wherein the energy storage system 8 is an electric energy storage system. According to such embodiments, step of estimating 122 the braking capacity of the auxiliary braking system 1 may comprise:

estimating 124 the braking capacity of the auxiliary braking system 1 based on a state of charge of the energy storage system 8.

Optionally, the auxiliary braking system 1 is a regenerative braking system configured to store energy derived from braking in an energy storage system 8 of the vehicle 2. According to such embodiments, the method 100 may comprise the step of:

estimating 126 the braking capacity of the auxiliary braking system 1 based on a temperature estimate of the energy storage system 8.

As indicated in FIG. 3, the method 100 may comprise the step of:

obtaining 103 the temperature estimate of the energy storage system 8.

The step of obtaining 103 the temperature estimate of the energy storage system 8 may comprise a measurement of a temperature of the energy storage system 8 and/or an estimation of the temperature of the energy storage system 8.

As indicated in FIG. 3, the method 100 may comprise the step of:

adjusting 132 the first threshold ratio based on a temperature estimate of the wheel brakes 3, 3' of the vehicle 2.

As indicated in FIG. 3, the method 100 may comprise the step of:

obtaining 105 the temperature estimate of the wheel brakes 3, 3' of the vehicle 2.

The step of obtaining 105 the temperature estimate of the wheel brakes 3, 3' of the vehicle 2 may comprise a measurement of a temperature of the wheel brakes 3, 3' and/or an estimation of the temperature of the wheel brakes 3, 3'.

The step of adjusting 132 the first threshold ratio may comprise the steps of:

increasing the first threshold ratio with increasing temperature estimates of the wheel brakes 3, 3' of the vehicle 2, and reducing the first threshold ratio with reducing temperature estimates of the wheel brakes 3, 3' of the vehicle 2.

Moreover, as indicated in FIG. 3, the method 100 may comprise the step of:

controlling 140 the at least one liftable wheel axle a3 from the lowered position to the lifted position when the ratio between the estimated braking capacity and the estimated braking need exceeds a second threshold ratio, wherein the second threshold ratio is greater than the first threshold ratio.

It will be appreciated that the various embodiments described for the method 100 are all combinable with the control arrangement 21 as described herein. That is, the control arrangement 21 may be configured to perform any one of the method steps 103, 105, 110, 112, 114, 120, 122, 124, 126, 130, 132, and 140 of the method 100.

Figure 4:
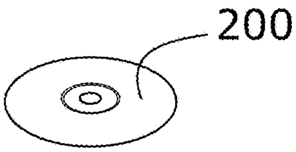
FIG. 4 illustrates a computer-readable medium.

FIG. 4 illustrates a computer-readable medium 200 comprising instructions which, when executed by a computer, cause the computer to carry out the method 100 according to some embodiments of the present disclosure. According to some embodiments, the computer-readable medium 200 comprises a computer program comprising instructions which, when the program is executed by a computer, cause the computer to carry out the method 100 according to some embodiments. The computer may be comprised in the control arrangement 21.

One skilled in the art will appreciate that the method 100 of controlling operation of a vehicle 2 may be implemented by programmed instructions. These programmed instructions are typically constituted by a computer program, which, when it is executed in the control arrangement 21, ensures that the control arrangement 21 carries out the desired control, such as the method steps 103, 105, 110, 112, 114, 120, 122, 124, 126, 130, 132, and 140 described herein. The computer program is usually part of a computer program product which comprises a suitable digital storage medium on which the computer program is stored, such as the computer-readable medium 200 illustrated in FIG. 4. In other words, the computer program product may be a computer readable medium 200 and the computer program may be stored in the computer readable medium 200.

The control arrangement 21 may comprise a computer which may take the form of substantially any suitable type of hardware or hardware/firmware device implemented using processing circuitry such as, but not limited to, a processor, Central Processing Unit (CPU), a controller, an arithmetic logic unit (ALU), a digital signal processor, an Application Specific Integrated Circuit (ASIC), a circuit for digital signal processing (digital signal processor, DSP), a microcomputer, a field programmable gate array (FPGA), a System-on-Chip (SoC), a programmable logic unit, a microprocessor, an application-specific integrated circuit, or any other device capable of electronically performing operations in a defined manner, or other processing logic that may interpret and execute instructions. The herein utilised expression "computer" may represent a processing circuitry comprising a plurality of processing circuits, such as, e.g., any, some or all of the ones mentioned above.

The control arrangement 21 may further comprise a memory unit, wherein the computer may be connected to the memory unit, which may provide the computer with, for example, stored program code and/or stored data which the computer may need to enable it to do calculations. The computer may also be adapted to store partial or final results of calculations in the memory unit. The memory unit may comprise a physical device utilised to store data or programs, i.e., sequences of instructions, on a temporary or permanent basis. According to some embodiments, the memory unit may comprise integrated circuits comprising silicon-based transistors. The memory unit may comprise e.g. a memory card, a flash memory, a USB memory, a hard disc, or another similar volatile or non-volatile storage unit for storing data such as e.g. ROM (Read-Only Memory), PROM (Programmable Read-Only Memory), EPROM (Erasable PROM), EEPROM (Electrically Erasable PROM), etc. in different embodiments.

The control arrangement 21 is connected to components of the vehicle 2 for receiving and/or sending input and output signals. These input and output signals may comprise waveforms, pulses, or other attributes which the input signal receiving devices can detect as information and which can be converted to signals processable by the control arrangement 21. These signals may then be supplied to the computer. One or more output signal sending devices may be arranged to convert calculation results from the computer to output signals for conveying to other parts of the vehicle's control system and/or the component or components for which the signals are intended. Each of the connections to the respective components of the vehicle 2 for receiving and sending input and output signals may take the form of one or more from among a cable, a data bus, e.g. a CAN (controller area network) bus, a MOST (media orientated systems transport) bus or some other bus configuration, or a wireless connection.

In the embodiments illustrated, the vehicle 2 comprises a control arrangement 21 but might alternatively be implemented wholly or partly in two or more control arrangements, two or more control arrangements, or two or more control units.

Control systems in modern vehicles generally comprise a communication bus system consisting of one or more communication buses for connecting a number of electronic control units (ECUs), or controllers, to various components on board the vehicle. Such a control system may comprise a large number of control units and taking care of a specific function may be shared between two or more of them. Vehicles and engines of the type here concerned are therefore often provided with significantly more control arrangements than depicted in FIG. 1, as one skilled in the art will surely appreciate.

The computer-readable medium 200 may be provided for instance in the form of a data carrier carrying computer program code for performing at least some of the method steps 103, 105, 110, 112, 114, 120, 122, 124, 126, 130, 132, and 140 according to some embodiments of the method 100 when being loaded into one or more computers of the control arrangement 21. The data carrier may be, e.g. a CD ROM disc, as is illustrated in FIG. 4, or a ROM (read-only memory), a PROM (programmable read-only memory), an EPROM (erasable PROM), a flash memory, an EEPROM (electrically erasable PROM), a hard disc, a memory stick, an optical storage device, a magnetic storage device or any other appropriate medium such as a disk or tape that may hold machine readable data in a non-transitory manner. Accordingly, in some embodiments, the computer-readable medium 200 may be a non-transitory computer-readable medium, such as a tangible electronic, magnetic, optical, infrared, electromagnetic, and/or semiconductor system, apparatus, and/or device. The computer-readable medium 200 may furthermore be provided as computer program code on a server and may be downloaded to the control arrangement 21 remotely, e.g., over an Internet or an intranet connection, or via other wired or wireless communication systems.

It is to be understood that the foregoing is illustrative of various example embodiments and that the invention is defined only by the appended independent claims. A person skilled in the art will realize that the example embodiments may be modified, and that different features of the example embodiments may be combined to create embodiments other than those described herein, without departing from the scope of the present invention, as defined by the appended independent claims.

As used herein, the term "comprising" or "comprises" is open-ended, and includes one or more stated features, elements, steps, components, or functions but does not preclude the presence or addition of one or more other features, elements, steps, components, functions, or groups thereof.

The invention claimed is:

1. A method of controlling operation of a vehicle as it travels on a surface, wherein the method is performed by a control arrangement, and wherein the vehicle comprises: a plurality of wheel axles each comprising a set of wheels and wheel brakes controllable to brake the set of wheels, and an auxiliary braking system controllable to brake the vehicle, wherein one or more of the plurality of wheel axles is a liftable wheel axle being controllable between a lifted position in which the set of wheels connected to the liftable wheel axle are not in contact with the surface and a lowered position in which the set of wheels are in contact with the surface, and wherein the method comprises:

controlling at least one of the one or more liftable wheel axles from the lifted position to the lowered position if the at least one liftable wheel axle is in the lifted position and a ratio between an estimated braking capacity of the auxiliary braking system and a current or impending braking need of the vehicle is below a first threshold ratio.

2. The method according to claim 1, wherein the method further comprises:

estimating the current or impending braking need of the vehicle based on inclination data representative of an inclination of a current and/or upcoming downhill slope of a road section on which the vehicle is/will be travelling.

3. The method according to claim 1, wherein the method comprises:

estimating the current or impending braking need of the vehicle based on a distance to a preceding vehicle.

4. The method according to claim 1, wherein the auxiliary braking system is a regenerative braking system configured to store energy derived from braking in an energy storage system of the vehicle, and wherein the method further comprises:

estimating the braking capacity of the auxiliary braking system based on an energy storing capacity of the energy storage system.

5. The method according to claim 4, wherein the auxiliary braking system is an electric regenerative braking system comprising an electric machine controllable to brake the vehicle, and wherein the energy storage system is an electric energy storage system, and wherein estimating the braking capacity of the auxiliary braking system comprises:

estimating the braking capacity of the auxiliary braking system based on a state of charge of the energy storage system.

6. The method according to claim 1, wherein the auxiliary braking system is a regenerative braking system configured to store energy derived from braking in an energy storage system of the vehicle, and wherein the method further comprises:

estimating the braking capacity of the auxiliary braking system based on a temperature estimate of the energy storage system.

7. The method according to claim 1, wherein the method further comprises:

adjusting the first threshold ratio based on a temperature estimate of the wheel brakes of the vehicle.

8. The method according to claim 1, wherein the method further comprises:

controlling the at least one liftable wheel axle from the lowered position to the lifted position when the ratio between the estimated braking capacity and the estimated braking need exceeds a second threshold ratio, wherein the second threshold ratio is greater than the first threshold ratio.

9. A computer program product stored on a non-transitory computer-readable medium, said computer program product for controlling operation of a vehicle as it travels on a surface, wherein the vehicle comprises: a plurality of wheel axles each comprising a set of wheels and wheel brakes controllable to brake the set of wheels, and an auxiliary braking system controllable to brake the vehicle, wherein one or more of the plurality of wheel axles is a liftable wheel axle being controllable between a lifted position in which the set of wheels connected to the liftable wheel axle are not in contact with the surface and a lowered position in which the set of wheels are in contact with the surface, wherein said computer program product comprising computer instructions to cause one or more computing devices to perform the following operation:

controlling at least one of the one or more liftable wheel axles from the lifted position to the lowered position if the at least one liftable wheel axle is in the lifted position and a ratio between an estimated braking capacity of the auxiliary braking system and a current or impending braking need of the vehicle is below a first threshold ratio.

10. A control arrangement configured to control operation of a vehicle as it travels on a surface, and wherein the vehicle comprises: a plurality of wheel axles each comprising a set of wheels and wheel brakes controllable to brake the set of wheels, and an auxiliary braking system controllable to brake the vehicle, wherein one or more of the plurality of wheel axles is a liftable wheel axle being controllable between a lifted position in which the set of wheels connected to the liftable wheel axle are not in contact with the surface and a lowered position in which the set of wheels are in contact with the surface, and wherein the control arrangement is configured to:

control at least one of the one or more liftable wheel axles from the lifted position to the lowered position if the at least one liftable wheel axle is in the lifted position and a ratio between an estimated braking capacity of the auxiliary braking system and a current or impending braking need of the vehicle is below a first threshold ratio.

11. A vehicle comprising:

a plurality of wheel axles each comprising a set of wheels and wheel brakes controllable to brake the set of wheels as the vehicle travels on a surface;

an auxiliary braking system controllable to brake the vehicle, wherein one or more of the plurality of wheel axles is a liftable wheel axle being controllable between a lifted position in which the set of wheels connected to the liftable wheel axle are not in contact with the surface and a lowered position in which the set of wheels are in contact with the surface; and a control arrangement configured to:

control at least one of the one or more liftable wheel axles from the lifted position to the lowered position if the at least one liftable wheel axle is in the lifted position and a ratio between an estimated braking capacity of the auxiliary braking system and a current or impending braking need of the vehicle is below a first threshold ratio.

12. The vehicle according to claim 11, wherein the vehicle is a heavy road vehicle.

13. The control arrangement according to claim 10 further configured to:

estimate the current or impending braking need of the vehicle based on inclination data representative of an inclination of a current and/or upcoming downhill slope of a road section on which the vehicle is/will be travelling.

14. The control arrangement according to claim 10 further configured to:

estimating the current or impending braking need of the vehicle based on a distance to a preceding vehicle.

15. The control arrangement according to claim 10, wherein the auxiliary braking system is a regenerative braking system configured to store energy derived from braking in an energy storage system of the vehicle, and wherein the control arrangement is further configured to:

estimate the braking capacity of the auxiliary braking system based on an energy storing capacity of the energy storage system.

16. The control arrangement according to claim 15, wherein the auxiliary braking system is an electric regenerative braking system comprising an electric machine controllable to brake the vehicle, and wherein the energy storage system is an electric energy storage system, and wherein estimating the braking capacity of the auxiliary braking system comprises:

estimating the braking capacity of the auxiliary braking system based on a state of charge of the energy storage system.

17. The control arrangement according to claim 10, wherein the auxiliary braking system is a regenerative braking system configured to store energy derived from braking in an energy storage system of the vehicle, and wherein the control arrangement is further configured to:

estimate the braking capacity of the auxiliary braking system based on a temperature estimate of the energy storage system.

18. The control arrangement according to claim 10 further configured to:

adjust the first threshold ratio based on a temperature estimate of the wheel brakes of the vehicle.

19. The control arrangement according to claim 10 further configured to:

control the at least one liftable wheel axle from the lowered position to the lifted position when the ratio between the estimated braking capacity and the estimated braking need exceeds a second threshold ratio, wherein the second threshold ratio is greater than the first threshold ratio.

* * * * *